No. 740,014. Patented September 29, 1903.

UNITED STATES PATENT OFFICE.

JOHN HERMAN, OF LINCOLN, NEBRASKA.

PROCESS OF TREATING ORES.

SPECIFICATION forming part of Letters Patent No. 740,014, dated September 29, 1903.

Application filed November 14, 1902. Serial No. 131,421. (No specimens.)

*To all whom it may concern:*

Be it known that I, JOHN HERMAN, a citizen of the United States, residing at Lincoln, in the county of Lancaster and State of Nebraska, have invented new and useful Improvements in Processes of Treating Metals, of which the following is a specification.

My invention relates to the extraction of copper from ores, and has for one of its objects to provide a process which includes the formation of ferrous salts as waste or by products and the subsequent use thereof either alone or in conjunction with other chemicals for leaching copper ores.

Another object is to provide a process in which ferrous chlorid is used to dissolve carbonates and oxids of copper, assisted by free sulfuric acid or hydrochloric acid to neutralize interfering substances, such as lime, &c., and to attack the surface of the particles of copper oxid or carbonate, thereby rendering the copper oxid or carbonate more amenable to leaching with ferrous chlorid and common salt or other chlorids, if preferable.

Another object is to provide a process which includes the combination of the hydrochloric acid formed and the ferrous chlorid in the same solution and the subsequent regenerating of the ferrous chlorid with scrap-iron.

Another object is to provide a process for the treatment of ores containing lime, whereby the lime is removed by burning to form quicklime and the leaching may be done with water alone, the solution obtained being useful for the subsequent precipitation of copper from solutions. The ore freed from the interfering lime may then be leached by means of acids or by any of the methods specified herein.

Another object is to provide a process for treating cuprous oxid, artificial or natural, by means of sulfuric acid, which is converted to hydrochloric acid by means of ferrous chlorid, the ferrous chlorid being regenerated, if desired, by means of precipitation of copper chlorid formed with scrap-iron.

Other objects and advantages of the invention will be fully understood from the following description and claims.

In carrying out my process ferrous salts may be formed by roasting sulfid of copper ore or by leaching carbonate or oxid ores of copper with sulfuric acid to produce copper sulfate or with hydrochloric acid to produce copper chlorid and then precipitating the copper with scrap-iron.

In forming the ferrous salts in the first-mentioned way sulfid-of-copper ore is roasted at a low heat, the temperature being controlled so as to produce the best results. The roasting of the ore at a low heat forms sulfates of the copper and of some of the iron present instead of oxids of said metals, which would result from the use of a high heat. Silver, if present, may or may not be entirely converted into sulfate, this depending on whether or not the residue resulting from the leaching, presently described, is to be subjected to treatment. The roasting of the sulfid ore at a low heat is also desirable because of the production of a large percentage of ferrous sulfate instead of a large portion of ferric sulfate or oxid, the ferrous sulfate being susceptible of use to advantage in the further treatment of carbonate or oxid ores of copper, as hereinafter pointed out. After roasting the ore, as stated, I leach it, preferably while still hot, with water, when the copper and iron sulfates will dissolve, as will also any silver sulfate that has been formed. I then, if silver is present, pass the solution through or over copper turnings to effect the precipitation of the metallic silver and through or over scrap iron, whereby the metallic copper is precipitated. If no silver is present or it is not desired to recover the same, the solution is passed through the scrap-iron alone. When desired, the solution may be turned back and passed the second or more times through the residue subsequent to the first precipitation of copper. The use of the scrap-iron as a precipitant for the copper increases the amount of ferrous sulfate:

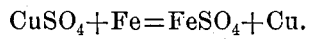
$$CuSO_4 + Fe = FeSO_4 + Cu.$$
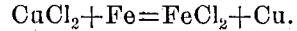
$$CuCl_2 + Fe = FeCl_2 + Cu.$$
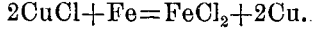
$$2CuCl + Fe = FeCl_2 + 2Cu.$$

The said ferrous sulfate or chlorid is highly desirable, as before stated, for further operations.

In forming the ferrous salts in the second-mentioned manner carbonate or oxid ores of copper are leached with sulfuric acid, whereby copper sulfate is formed, or with hydrochloric acid, whereby copper chlorid is formed, and the copper is precipitated with scrap-iron, which increases the amount of ferrous salts.

In the treatment of ores containing lime the lime is first removed by heating and then leaching with water. Then the residue containing the copper is leached with free acid or acids, or with ferrous chlorid and salt, or with the combination of both, or, if desired, fresh pyrites may be added and the whole treated as a sulfid ore would be. The lime solution resulting from the leaching of quicklime, as mentioned, may be used for precipitating copper in the form of cuprous or cupric oxids or hydroxids in place of using iron for precipitating metallic copper.

In the treatment of cuprous or red oxid of copper ($Cu_2O$) it is desirable to use hydrochloric rather than sulfuric acid, this because in the reaction between cuprous oxid and sulfuric acid hydrogen is liberated and reacts upon free sulfuric acid to decompose it thus:

First—

$$Cu_2O + 2H_2SO_4 = 2CuSO_4 + H_2O + 2H.$$

Second—

$$2H + H_2SO_4 = 2H_2O + SO_2.$$

Hydrogen does not decompose hydrochloric acid; hence the advantage of adding ferrous chlorid in the leaching of red oxid of copper. Should there be any oxychlorid of iron or ferric chlorid present, ferrous chlorid will be formed by the hydrogen liberated and hydrochloric acid be liberated, both reactions being highly desirable. Moreover, there will be a tendency to form cuprous instead of cupric compounds. All these conditions tend to require less acid for leaching out the copper.

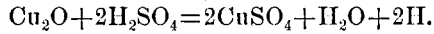
$$H_2SO_4 + FeCl_2 = 2HCl + FeSO_4.$$
$$Cu_2O + 4HCl = 2CuCl_2 + H_2O + 2H.$$
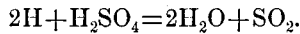
$$FeCl_3 + H = FeCl_2 + HCl.$$

It is necessary in order to fulfil the purpose of the process to convert the ferrous salts to the chlorid and to produce a solution having at least more than enough salt to convert $FeSO_4$ to $FeCl_2$. This is done by adding common salt or other chlorids, if preferable, to the solution either before or after precipitating the metals.

If the residue from the leaching contains gold, the same may be treated by any of the ordinary modes with a view of saving the precious metal. It will also be observed that the ores are rendered free-milling and that the process may be used to accomplish this purpose, as well as to save copper and silver.

Sulfid-of-copper ores may be roasted with common salt or other chlorids, if preferable, to form copper chlorid, the proportion of salt depending entirely on the percentage of copper and being added generally, but not essentially, after the sulfur percentage is reduced nearly to the same percentage as there is copper in the ore. In roasting the ore with salt, leaching, and finally precipitating with scrap-iron ferrous chlorid is formed. The ferric chlorid which is formed somewhat in the roasting is reduced to ferrous chlorid by the scrap-iron, which always serves incident to precipitation to generate ferrous compounds.

If silver is present in the ore, it is extracted by the above roasting in presence of excess of salt, the ore is leached with a strong salt solution to dissolve the silver chlorid, and the silver is precipitated by means of metallic copper.

The fumes from the chlorid roasting may, if desired, be used to neutralize the carbonates of calcium and other metals which might interfere with leaching or to produce HCl.

The solution of ferrous chlorid (obtained in any of the ways described in the foregoing) and salt is highly efficient in dissolving copper and such silver as is in amenable compounds out of carbonate and oxid ores and is used for such purposes. Then after leaching precipitation is carried on as before stated and with the same advantage—viz., the formation of ferrous salts. This ore in most cases is also rendered free-milling, and if gold or silver is present in the residue they may be saved by the methods ordinarily practiced.

The reaction whereby copper is dissolved by ferrous chlorid and salt is:

$$2FeCl_2 + 3CuO = 2CuCl + CuCl_2 + Fe_2O_3.$$

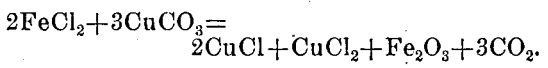
$$2FeCl_2 + 3CuCO_3 = 2CuCl + CuCl_2 + Fe_2O_3 + 3CO_2.$$

The cupric chlorid is soluble in water, as is also cuprous chlorid, when in the presence of the other chlorids.

When desired, ferrous chlorid may with the assistance of sulfuric acid or hydrochloric acid, be employed to dissolve carbonates and oxids of copper and to neutralize interfering substances, such as lime, &c., and to attack the surface of the particles of copper oxid or carbonate, thereby rendering the copper oxid or carbonate more amenable to leaching with ferrous chlorid and salt. The acid may be added at the commencement of the operation, or it may be added at intervals incident to the same, whenever the action of the ferrous chlorid ceases, or it may be added after leaching with ferrous chlorid or ferrous compounds obtained by precipitation with iron. By preference the acid is added in time to be decomposed before precipitating with iron.

The combination of the hydrochloric acid formed and the ferrous chlorid in the same solution and the subsequent regenerating of the ferrous chlorid with scrap-iron offers the advantages of leaching with free acid, together with the consumption of but a minimum amount of acid, also the use of but a minimum amount of iron for precipitation. But little iron is used, because there is no acid left free after the treatment to consume the iron. The copper is also mainly in a cuprous condition.

Without the use of a small quantity of free acid many ores are not amenable to treatment with ferrous chlorid and salt.

Waste in strength of solution may be compensated for—i. e., the strength of the solution may be kept up by adding free surfuric acid to the ferrous-chlorid solution. The sulfuric acid forms hydrochloric acid in the solution, which will consume interferences like carbonates and which will attack the exposed surfaces of carbonate or oxid of copper particles. This will render the remainder of the copper present more amenable to the action of ferrous chlorid and remove the cause of low extraction which might otherwise be experienced with $FeCl_2$ alone. It is desirable and frequently necessary to use some free acid in connection with ferrous chlorid for the purpose stated.

It is desirable in most cases to heat the ore precedent to treatment and to use the solutions in a heated state.

Copper silicate is not acted on either by ferrous chlorid or any dilute acid. It may, however, be made amenable to treatment by heating previous to treatment.

Red oxid of copper, ($Cu_2O$,) for instance, which is only partially attacked in treating with ferrous chlorid or dilute acids, is changed to the amenable black oxid, (CuO,) by proper heating before treatment.

In some cases carbonates and oxids of copper which otherwise resist treatment are rendered amenable by heating precedent to treatment to change physical conditions.

Aluminium carbonate may be changed to the oxid by heating.

Lime or other carbonates which interfere may be converted to oxid by using sufficient heat.

The oxids of calcium and barium may be removed by washing the ore, which has been heated or "burned," with water. The solution thus formed may be used to advantage in cyaniding to neutralize acids and solutions which decompose potassium cyanid, also to precipitate copper from solutions as $Cu_2O$ or CuO or as $Cu(OH)_2$.

When desirable, the regeneration of free acid may be effected by the electrolytic precipitation of copper from the chlorid or sulfate, the acid being adapted to be used for copper-leaching.

It will be readily appreciated from the foregoing that my process is materially advantageous, because instead of expensive chemicals it utilizes waste products, also because the solutions may be repeatedly used to advantage.

Waste solutions obtained from the precipitation of copper by means of scrap-iron, which contain ferrous salts and may or may not contain ferric salts, or waste solutions obtained by precipitating copper with lime, which contain calcium chlorid, may be used as follows: Evaporate the solutions and mix the residue with any ore which is to be leached at any time before the final lixiviation of the copper and heat the mixture. By this procedure interferences—such as lead, zinc, &c.—are converted to sulfates or chlorids. The same procedure may also be used to chloridize copper contained in the ore.

Having described my invention, what I claim, and desire to secure by Letters Patent, is—

1. A process of extracting copper from ores, which consists in utilizing ferrous chlorid and free acid to dissolve carbonates and oxids of copper; the free acid being adapted to neutralize interfering substances, and to attack the surface of the particles of copper oxid or carbonate, and leaching the ore thus treated with ferrous chlorid and common salt or other suitable chlorid.

2. A process of extracting copper from ores, which consists in treating ores containing iron, with a chlorin-containing compound to produce ferrous chlorid, utilizing the chlorid and free acid to dissolve carbonates and oxids of copper; the free acid being adapted to neutralize interfering substances, and to attack the surface of the particles of copper oxid or carbonate, and leaching the ore thus treated with ferrous chlorid and common salt or other suitable chlorid.

3. A process of extracting copper from ores which consists in treating ore containing iron with hydrochloric acid to produce ferrous chlorid, and using a solution of the ferrous chlorid and salt or other suitable chlorid to dissolve copper and such silver as is in amenable compounds out of carbonate and oxid ores.

4. A process of extracting copper from ores which consists in utilizing ferrous chlorid and free acid to dissolve carbonates and oxids of copper, the free acid being adapted to neutralize interfering substances and to attack the surface of the particles of copper oxid or carbonate, and leaching the ore thus treated with ferrous chlorid and common salt or other suitable chlorid.

5. A process of extracting copper from ores which consists in treating ore containing iron with hydrochloric acid to produce ferrous chlorid, utilizing the ferrous chlorid and free acid to dissolve carbonates and oxids of copper, and leaching the ore thus treated with ferrous chlorid and salt or other suitable chlorid.

6. A process of extracting copper from ores which consists in leaching ore containing iron with suitable acid to produce ferrous salts as a by-product, converting the ferrous salts to ferrous chlorid, and utilizing the ferrous chlorid and free acid to dissolve carbonates and oxids of copper; the free acid being adapted to neutralize interfering substances and to attack the surface of the particles of copper oxid or carbonate, and leaching the ore thus treated with water or with ferrous chlorid and common salt or other suitable chlorid.

7. A process of extracting copper from ores which consists in treating ore containing iron with hydrochloric acid to reduce ferric to ferrous chlorid and cupric to cuprous chlorid, whereby the hydrogen, instead of decomposing acid, saves both acid and iron when ferrous or ferric chlorids from the waste solutions are used, and utilizing the ferrous chlorid to dissolve carbonates and oxids of copper.

8. A process of extracting copper from ores which consists in treating ore containing iron to produce ferrous chlorid, utilizing the chlorid and free acid to dissolve carbonates and oxids of copper, the free acid being adapted to neutralize interfering substances and to attack the surface of the particles of copper oxid or carbonate, and regenerating the free acid by the electrolytic precipitation of copper.

In testimony whereof I have hereunto set my hand in presence of two subscribing witnesses.

JOHN HERMAN.

Witnesses:
WILLIAM BLACKBURN,
JOHN GARNETT MOIR.